United States Patent
Khwaja et al.

(10) Patent No.: US 10,419,481 B1
(45) Date of Patent: Sep. 17, 2019

(54) METHODS AND SYSTEMS FOR OVERLAPPING PROTECTION DOMAIN IN NETWORK DEVICES

(71) Applicant: Cavium, Inc., Aliso Viejo, CA (US)

(72) Inventors: Ali A. Khwaja, Irvine, CA (US); David T. Kwak, Newport Coast, CA (US); Biswajit Khandai, Foothill Ranch, CA (US); Oscar L. Grijalva, Cypress, CA (US); Rajendra R. Gandhi, Laguna Niguel, CA (US)

(73) Assignee: Cavium, LLC, Santa Clara, CA (US)

( * ) Notice: Subject to any disclaimer, the term of this patent is extended or adjusted under 35 U.S.C. 154(b) by 139 days.

(21) Appl. No.: 15/596,860

(22) Filed: May 16, 2017

(51) Int. Cl.
| | |
|---|---|
| *H04L 29/06* | (2006.01) |
| *G06F 13/42* | (2006.01) |
| *G06F 13/28* | (2006.01) |
| *G06F 12/14* | (2006.01) |
| *G06F 11/10* | (2006.01) |
| *H04L 9/06* | (2006.01) |

(52) U.S. Cl.
CPC ........ *H04L 63/164* (2013.01); *G06F 11/1004* (2013.01); *G06F 12/1408* (2013.01); *G06F 13/28* (2013.01); *G06F 13/426* (2013.01); *G06F 2212/1052* (2013.01); *G06F 2213/0026* (2013.01); *H04L 9/0631* (2013.01)

(58) Field of Classification Search
CPC . H04L 63/164; H04L 9/0631; G06F 12/1408; G06F 13/28; G06F 13/426; G06F 11/1004; G06F 2212/1052; G06F 2213/0026
See application file for complete search history.

(56) References Cited

U.S. PATENT DOCUMENTS

| | | | | |
|---|---|---|---|---|
| 2007/0180227 A1* | 8/2007 | Akimoto | ............. | H04L 63/0464 713/153 |
| 2009/0307557 A1* | 12/2009 | Rao | ........ | H04L 1/1874 714/749 |
| 2011/0022916 A1* | 1/2011 | Desai | .............. | G06F 1/3203 714/748 |
| 2011/0022935 A1* | 1/2011 | McDaniel | ............. | H04L 63/123 714/807 |

* cited by examiner

*Primary Examiner* — Beemnet W Dada
*Assistant Examiner* — Ka Shan Choy
(74) *Attorney, Agent, or Firm* — Klein, O'Neill & Singh, LLP

(57) ABSTRACT

Methods and systems for securing data are provided. For example, one method includes receiving at an adapter, data with a first type of error protection code from a host memory of a computing device; adding by the adapter a second type of error protection code to the data before removing the first type of error protection code; generating by the adapter, a frame header for the data with a protocol specific protection code and a third type of error protection code, where the third type of error protection code is generated without using any frame header field; encrypting by the adapter, the data, the protocol specific protection code and the third type of error protection code; and transmitting by the adapter, the encrypted data with encrypted protocol specific protection code and encrypted third type of error protection code to a receiving adapter coupled to the adapter by a network link.

20 Claims, 9 Drawing Sheets

Overlapping Protection Domain

US 10,419,481 B1

METHODS AND SYSTEMS FOR OVERLAPPING PROTECTION DOMAIN IN NETWORK DEVICES

TECHNICAL FIELD

The present invention relates to securing data by network devices.

BACKGROUND

Computing systems typically use adapters and network devices for sending data to and receiving data from mass storage devices. It is desirable to completely secure data that is sent and received by adapters. Continuous efforts are being made to efficiently secure data by adapters and other network devices.

BRIEF DESCRIPTION OF THE DRAWINGS

The various aspects relating to securing data will now be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
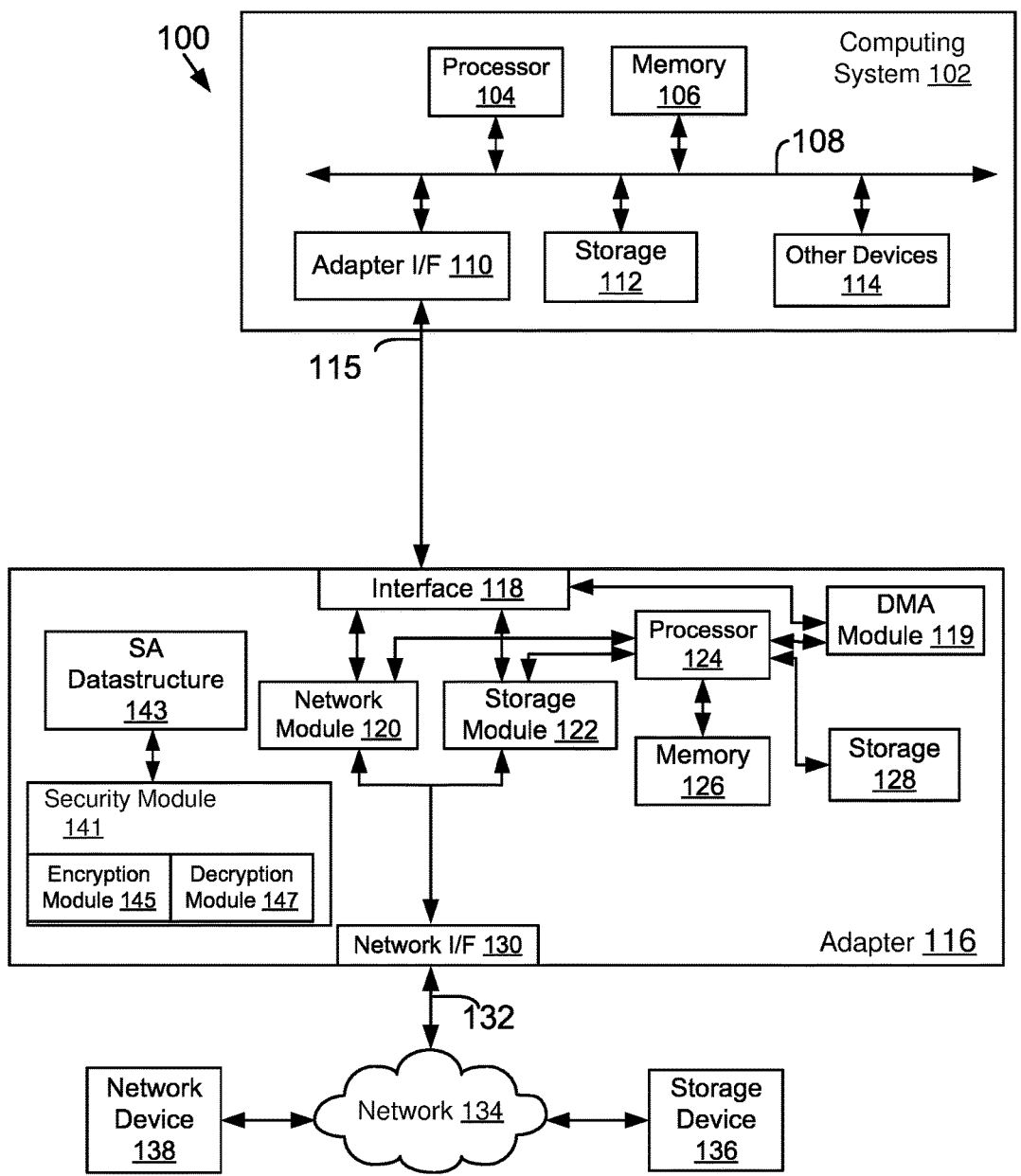
FIG. 1A is a functional block diagram of a system with a security module coupled to a computing system and an adapter, according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices and maybe based on the various process flows described below in detail.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

In one aspect, methods and systems for securing data are provided. For example, one method includes receiving at an adapter, data with a first type of error protection code from a host memory of a computing device; adding by the adapter a second type of error protection code to the data before removing the first type of error protection code; generating by the adapter, a frame header for the data with a protocol specific protection code and a third type of error protection code, where the third type of error protection code is generated without using any frame header field; encrypting by the adapter, the data, the protocol specific protection code and the third type of error protection code; and transmitting by the adapter, the encrypted data with encrypted protocol specific protection code and encrypted third type of error protection code to a receiving adapter coupled to the adapter by a network link.

System 100:

FIG. 1A shows an example of a system 100 configured for use with the various aspects of the present disclosure. System 100 may include one or more computing systems 102 (may also be referred to as "host system 102") coupled to an adapter 116 having a security module 141 via a link 115. The security module 141 includes an encryption module 145 and a decryption module 147 for encrypting and decrypting information, respectively. Link 115 may be an interconnect system, for example, a PCI-Express (PCIe) link or any other interconnect type. The adapter 116 interfaces with a network 134 via one or more network links 132. The network 134 may include, for example, additional computing systems, servers, storage systems, etc. The security module 141 is used by the adapter 116 to encrypt data before data is transmitted to another device, for example, storage device 136, and decrypt encrypted data that is received from the network 134, described below in detail.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

The computing system 102 may also include other devices and interface 114, which may include a display device interface, a keyboard interface, a pointing device interface, etc. Details regarding the other devices 114 are not germane to the aspects disclosed herein.

The computing system 102 may further include a local storage device 112, which may be for example a hard disk, a CD-ROM, a non-volatile memory device (flash or memory stick) or any other mass storage device. Storage 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 (maybe referred to as host memory 106) also interfaces with the computer bus 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

In one aspect, adapter 116 may be configured to handle both network and storage traffic. Various network and storage protocols may be used to handle network and storage traffic. Some common protocols/technologies are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support higher data transfer rates for example, above 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

To protect Fibre Channel frames, the Fibre Channel standards provide the FC-SP-2 protocol. The protocol provides the basic mechanism/requirements for secured communication using encryption.

Fibre Channel over Ethernet (FCOE) has been developed to handle both Ethernet and Fibre Channel traffic in a storage area network (SAN). This functionality enables Fibre Channel to leverage high-speed Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations.

Referring back to FIG. 1A, adapter 116 communicates with host system 102 via an interface 118 and link 115. In one aspect, interface 118 may be a PCI Express interface having logic/circuitry for sending and receiving PCI-Express packets. The adapter 116 may also include a processor 124 that executes firmware instructions out of a memory 126 to control overall adapter operations. The adapter 116 may also include local storage 128, which may be for example non-volatile memory, such as flash memory, or any other device. The local storage 128 may store executable instructions and operating parameters that can be used for controlling adapter operations.

The adapter 116 includes a network module 120 for handling network traffic via a link 132. In one aspect, the network module 120 includes logic and circuitry for handling network packets, for example, Ethernet or any other type of network packets. The network module 120 may include memory buffers to temporarily store information received from other network devices 138 and transmitted to other network devices 138.

The adapter 116 may also include a storage module 122 for handling storage traffic to and from storage devices 136. The storage module 112 may further include memory buffers to temporarily store information received from the storage devices 136 and transmitted by the adapter 116 to the storage devices 136. In one aspect, the storage module 122 is configured to process storage traffic according to the Fibre Channel storage protocol, or any other protocol. It is noteworthy that adapter 116 may only have a network module 120 or a storage module 122. The various aspects described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 151. The DMA module 119 uses a plurality of DMA channels (not shown) for managing access to link 151. The DMA channels are typically used to move control structures such as Input/Output control blocks (IOCBs), input/output status blocks (IOSBs) and data between host system memory 106 and the adapter memory 126. It is noteworthy that the DMA module 119 may have a transmit side DMA segment to bring data from host memory 106 to the adapter and a receive side DMA segment to send data to the host memory 106

The security module 141 includes or has access to a memory for example, 126 or dedicated memory, which maybe a double data rate (DDR) synchronous dynamic random-access memory or any other memory type. Memory 126 may be used to store one or more security association (SA) data structures 143 that are used to encrypt and decrypt data, as described below in detail. An index key maybe used for obtaining encryption parameters from data structure 143.

In one aspect, the encryption module 145 encrypts outgoing data (i.e. data to other devices from host memory 106) using different algorithms, for example, 3DES/DES, AES-GCM and other algorithm types. AES means advanced encryption standard that has been adopted by the US National Institute of Standards (USNIST). GCM means Galois/Counter Mode (GCM), a mode of operation for symmetric key cryptographic block ciphers for encrypting and decrypting data. It is noteworthy that the adaptive aspects are not limited to any specific standard or proprietary encryption/decryption standards.

The decryption module 147 uses the parameters stored at SA data structure 143 to decrypt encrypted frames that are received by adapter 116. To decrypt a frame, the decryption module 147 uses the same parameters that are used to encrypt the frame.

Figure 1B:
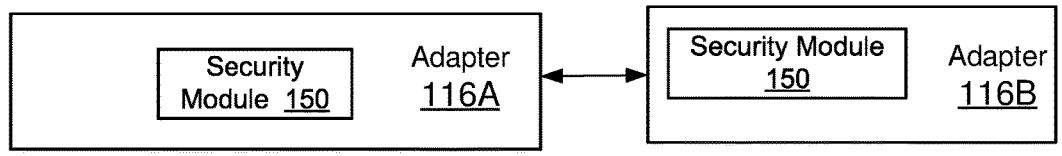
FIG. 1B shows a high level block diagram showing two adapters communicating with each other, according to one aspect of the present disclosure.

FIG. 1B shows an example of a transmitting adapter 116A that sends encrypted frames to a receiving adapter 116B. Both adapters have security modules 141 for encrypting and decrypting FC frames using the FC-SP-2 protocol for secured communication.

Figure 1C:
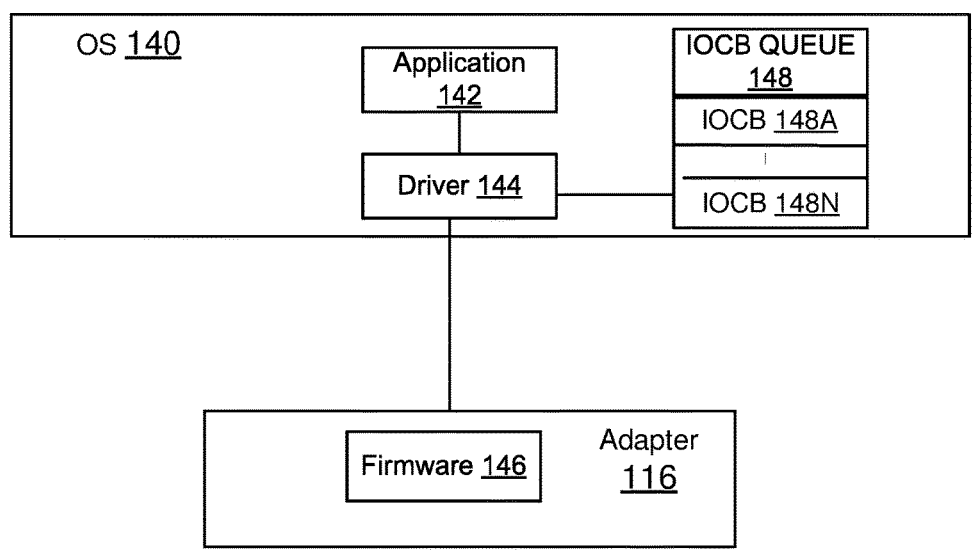
FIG. 1C shows a block diagram of a generic software architecture used by the system of FIG. 1A.

Software Architecture:

FIG. 1C shows an example of a generic software architecture used by the various components of system 100. Processor 104 of the host system 102 executes an operating system 140 for controlling the overall operations of host computing system 102. The operating system may be Windows based, Linux operating system, Solaris, or any other operating system type (without derogation of any third party trademark rights). The aspects disclosed herein are not limited to any particular operating system type.

An application 142 may be executed by processor 104 for performing certain functions. For example, application 142 may be an email program, a database application or any other application type. Application 142 may send a command to a host driver 144 for performing an operation, for example, reading and/or writing data (input/output (I/O) at another storage device. The driver 144 processes the request and communicates with firmware 146 executed by processor 124 of adapter 116. One or more components of adapter 116 then process the request.

Typically for managing data transfers across link 115 an IOCB (Input Output Control Block) is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels (not shown). Based on the IOCB, adapter 116 executes the operations that may be needed. Adapter 116 then uses DMA operation to send a status block (IOSB) to processor 104 indicating the completion of IOCB execution and associated data transfer.

Figure 1D:
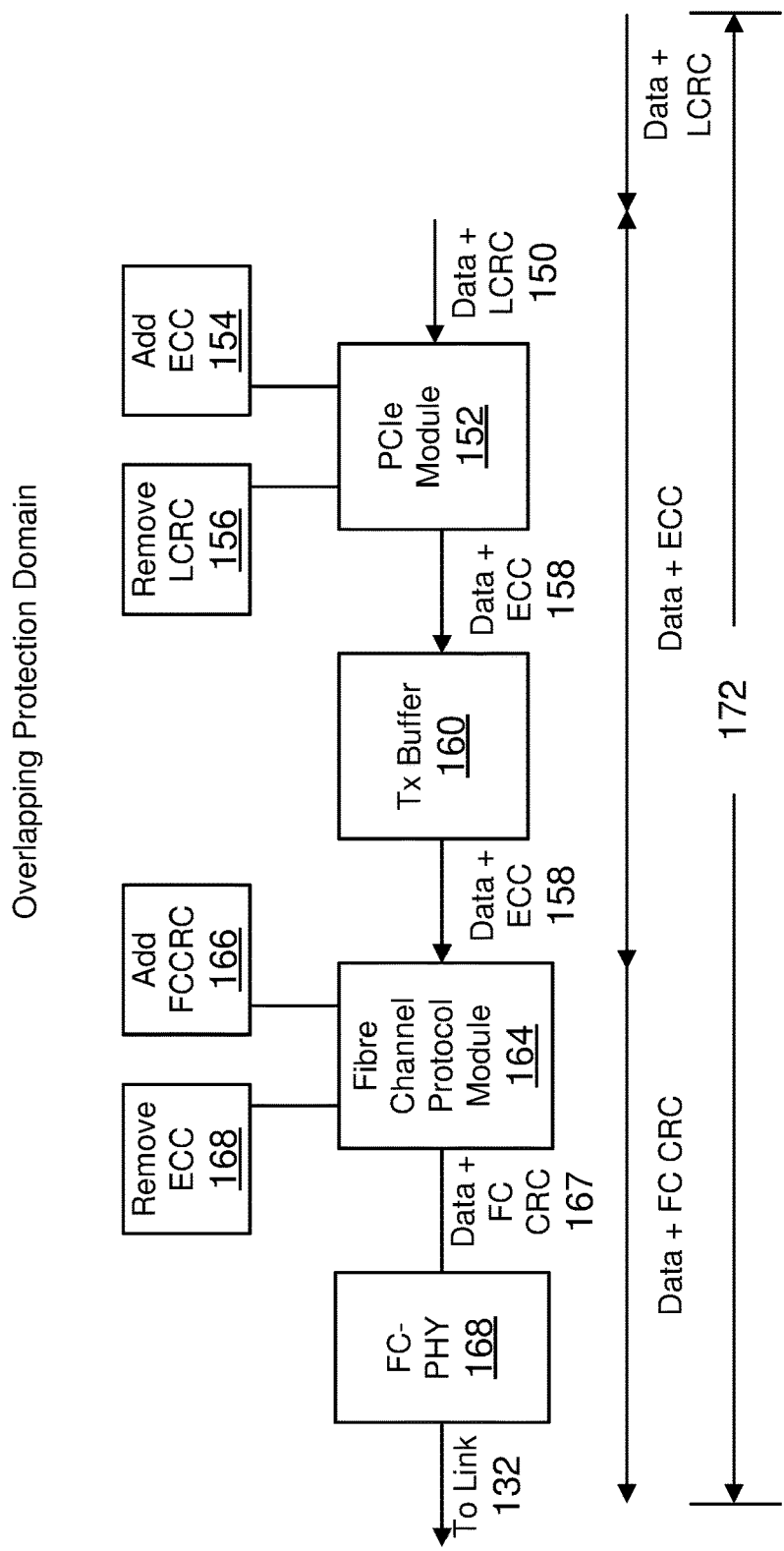
FIG. 1D shows an example of an overlapping protection domain (OPD) for transmitting a frame without encryption, according to one aspect of the present disclosure.

FIG. 1D shows an example of an overlapping protection domain (OPD) 172 for data that moves from the host memory 106 to adapter 116 without encryption and then to another device, for example, the networked storage device 136. Data from the host memory 106 is received with local cyclic redundancy code (CRC), shown as Data with LCRC 150. The LCRC is added by the host system 102 or an application executed by the host system 102.

CRC is an error-detecting code used to detect accidental changes to raw data. Blocks of data entering a system get a short check value attached, based on the remainder of a polynomial division of the data contents. On retrieval, the calculation is repeated and, in the event the check values do not match, corrective action can be taken against data corruption. In CRCs the check (data verification) value is a redundancy (i.e. it expands the message without adding information) and the algorithm is based on cyclic codes. The host system 102 calculates a short, fixed-length binary sequence, a CRC, for each block of data to be sent to adapter 116 and appends it to the data, forming a codeword. When the codeword is received or read, an adapter component (for example, the PCIe module 152) either compares its check value with a code value calculated from the data block, or performs a CRC on the whole codeword and compares the resulting check value with an expected residue constant. If the CRC check values do not match, then the block contains a data error.

The data with LCRC is received by the PCIe module 152 that maybe part of host interface 118. The PCIe module 152 first adds error correction code (ECC) to the data (shown as 154) and then removes the LCRC (shown as 156). ECC is a type of code that detects and corrects errors. Different type of ECC may be used, for example, the Reed-Solomon code may be used to detect and correct errors.

The data and ECC 158 are stored at a transmit buffer 160. The data and the ECC 158 are sent by the transmit buffer 160 to a Fibre Channel protocol (FPM) module 164. FPM 164 executes the FC protocol to prepare a FC frame for transmission. The FPM module 164 first adds FC CRC (Fibre Channel CRC that is specified by the FC protocol). Thereafter, the ECC that came with data as 158 is removed (shown as 168). The Fibre channel frame with the data payload and the FC CRC 167 is sent to a FC PHY module 168 that may be a part of network interface 130. The FC PHY module implements the physical layer (FC0) of the Fibre Channel protocol stack and includes cabling and connectors. Thereafter, the frame protected by the FC CRC is sent via the network link 132. As shown in FIG. 1D, the OPD 172 protects data as data moves through different components/modules from host memory 106 to the link 132.

Figure 1E:
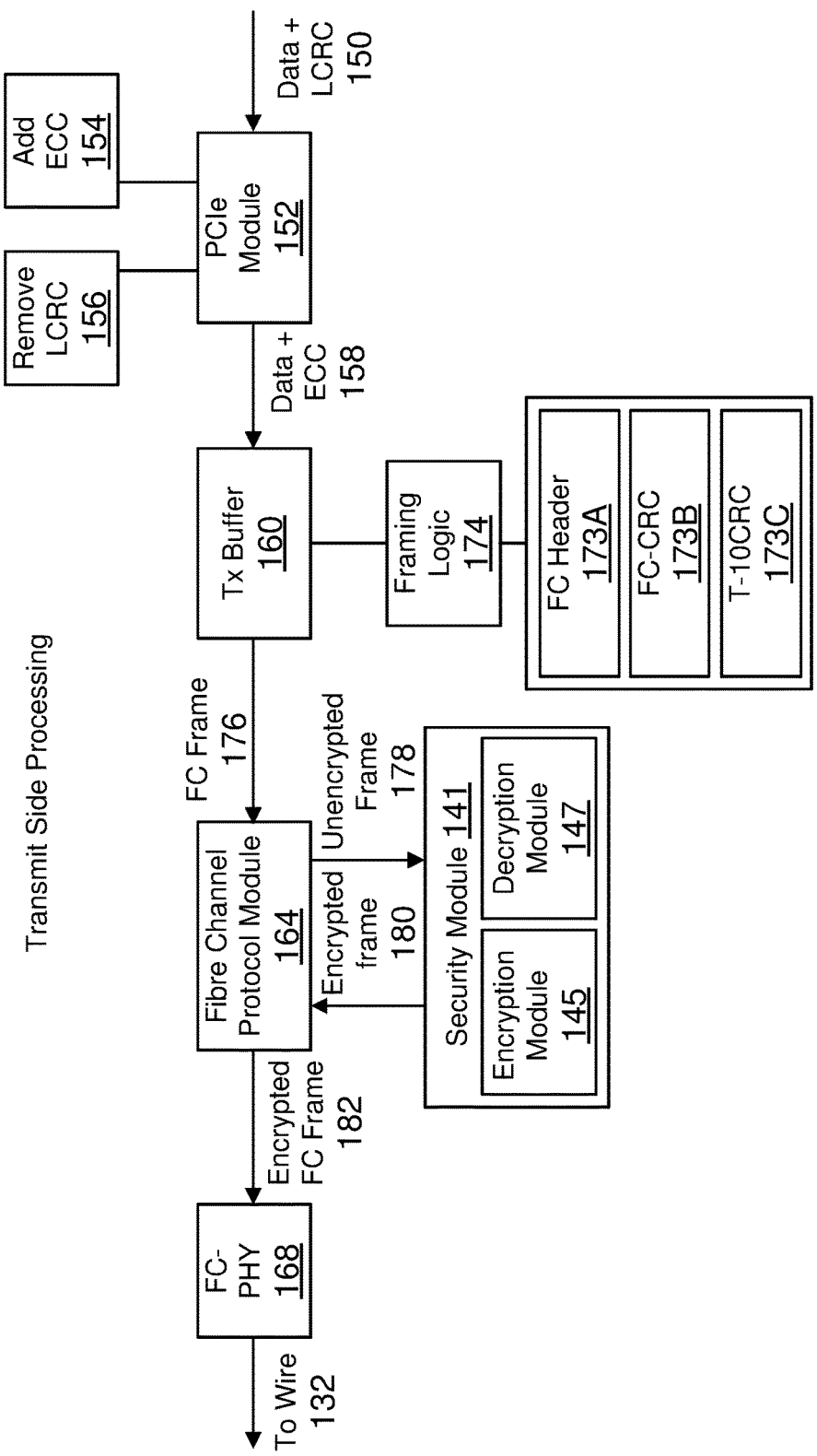
FIG. 1E shows example of using OPD for transmitting a frame using a security module, according to one aspect of the present disclosure.

One reason is that when the FPM module 164 provides data to the security module 141 for encryption, the data is no longer protected with FC CRC that was added by the FPM module 164. The inventive technology disclosed herein solves this challenge as shown in FIG. 1E, described below in detail In FIG. 1E, data and LCRC 150 are received by the PCIe module 152 that adds the CRC (154) and removes the LCRC (156), similar to FIG. 1D. The data and ECC 158 are provided to the transmit buffer 160. In one aspect, framing logic 174 generates a FC header 173A and the FC CRC 173B described below in detail. The framing logic 173B also generates another set of protection code, for example, T-10 CRC 173C for the data. T-10 CRC is defined by the T-10 sub-committee of the International Committee for Information Technology Standards. To generate the T-10 CRC, certain Fibre Channel header fields are ignored or set to zero, for example, a source identifier, a destination identifier, control and priority fields are ignored. These fields are described below in detail with respect to FIG. 2A. These fields are ignored because the fields change as a frame moves through various components of the network. It is noteworthy that adaptive aspects described herein are not limited to T-10 CRC and any other type of error checking/correction code may be used.

The FC frame with ECC (shown as 176) is then provided to the FPM 164. FPM 164 first removes the ECC. The FC frame with the T-10 CRC shown as 178 is then provided to the security module 141. The encryption module 145 encrypts the payload, the FC-CRC and the T-10 CRC. The encryption module 145 generates an ESP header/trailer using the SA data structure 143. The encrypted frame 180 is then provided to the FPM module 164 and then sent to the FC-PHY module 168 (shown as 182) and then sent to its destination via link 132. It is noteworthy that the encrypted frame maybe provided directly to the FC-PHY 168.

Figure 1F:
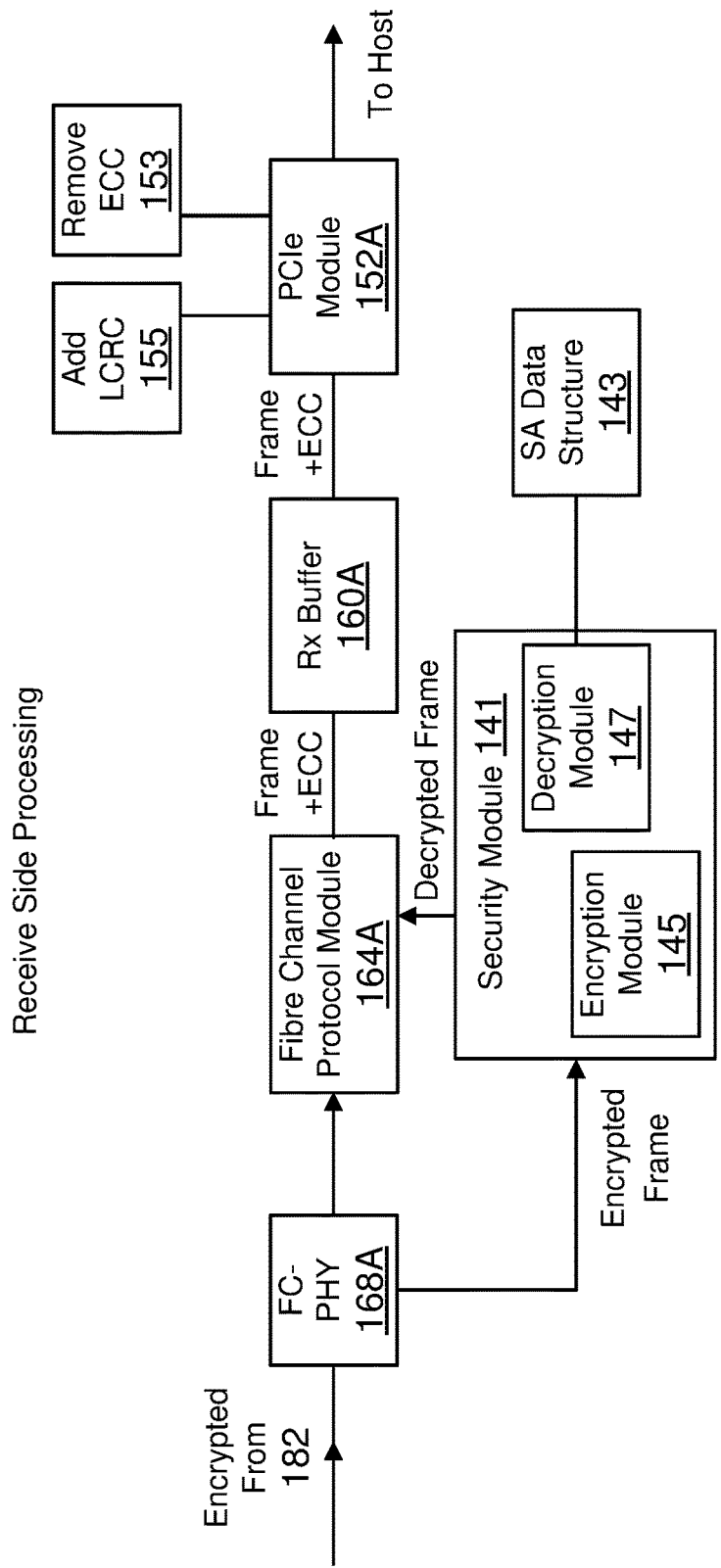
FIG. 1F shows an example of using OPD at an adapter receiving encrypted frames, according to one aspect of the present disclosure.

FIG. 1F shows a block diagram for processing the encrypted frame 182 at a receiving adapter (for example, 116B, FIG. 1B). The encrypted frame 182 is received by the FC-PHY 168A and then provided to the security module 141. In another aspect, the encrypted frame is provided to the FPM 164A and then provided to the security module 141. The decryption module 147 performs a look-up operation at the SA data structure 143 using a security parameter index (SPI) described below in detail. If there is a match, the decryption module 147 strips the ESP header and trailer from the encrypted frame 182. The decryption module 147 also generates FC-CRC and the T-10 CRC. The generated FC-CRC and the T-10 CRC are compared to the FC-CRC and the T-10 CRC from the frame 182. An integrity check value (ICV 214, FIGS. 2A/2B) is also verified. If the verification is successful, the frame is provided to the FPM 164A. The FPM 164A first adds ECC and then removes the FC-CRC. The frame with ECC is placed at a receive buffer 160A and provided to the PCIe module 152A. The PCIe module 152A adds LCRC (shown as 155) and removes the ECC (shown as 153). The payload with the LCRC is then provided to the host via a DMA operation.

Before describing the various processes of the present disclosure, the following describes the structure of an encrypted Fibre Channel frame.

Figure 2A:
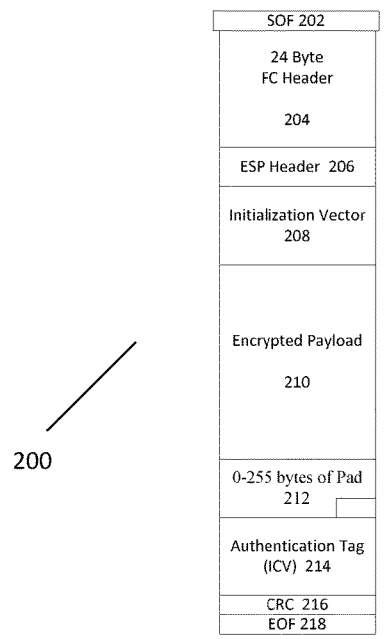
FIG. 2A shows an example of an encrypted Fibre Channel frame, used according to one aspect of the present disclosure.

Encrypted Fibre Channel Frame:

FIG. 2A shows an example of an encrypted Fibre Channel frame 200 for implementing the methods and systems, described herein. As an example, the frame 200 includes a start of frame (SOF) field 202 that indicates the beginning of the FC frame. The frame includes a 24 byte header 204 that is reproduced in FIG. 2A with various fields, for example, R_CTL: a routing control field; CS-CTL field that assigns a frame's priority; a Type field indicating the frame type; D_ID: a field that identifies a destination; S_ID: a source identifier; and F_CTL: a flag for frame control (e.g. abort and others). The SEQ_ID is an unsigned binary number identifying the sequence of which the frame is a part. The SEQ_ID is assigned by a sequence initiator and is unique for a specific D_ID and S_ID pair, while the sequence is open. The SEQ_CNT is an unsigned binary number identifying the order of frame transmission within a single sequence or multiple consecutive sequences for the same exchange.

OX_ID is the originator exchange ID field that identifies an exchange ID assigned by the originator of an exchange. This field is also used by the originator exchange status block to track the progress of a series of sequences that comprise an exchange.

RX_ID is the responder exchange ID field assigned by a responder to provide a unique identifier for an exchange established by an originator and identified by an OX_ID. The "Parameter" field is a relative offset for data or link control information. The DF-CTL field provides control flags and maybe used to indicate if a frame is encrypted or not.

In one aspect, frame 200 also includes an encapsulating security payload (ESP) header 206. The ESP header 206 includes a security parameter index (SPI) for identifying an entry at the security data structure 143 stored at memory 126. The SPI may be a 4 bytes field and has its own keys, sequence number and salt values. To perform encryption or decryption, SPI is used as an index for a lookup operation to retrieve encryption parameters for a frame. The data structure 143 identifies a key and the algorithm used for encrypting data.

In one aspect, before an I/O or exchange, driver 144 associates a workflow handle for an I/O request with a security association handle at a workflow handle data structure (not shown). The workflow handle is used to lookup the security handle from another data structure. The security handle then enables a lookup of encryption parameters from data structure 143.

Frame 200 also includes an initialization vector (ICV) (or authentication tag) 208 that is used for encrypting and decrypting payload 210. A padding 212 is used to indicate the amount to adjust after decrypting the encrypted payload 210. The padding 212 may be used to include the T-10 CRC generated for a transmit frame described above with respect to FIG. 1F.

ICV 214 of frame 200 includes a hash of the frame header, the security parameter index, payload data and padding 212 with a common key between two communicating nodes. In one aspect, the authentication tag 214 and the frame header 204 are used to verify that the frame is received from an authorized node. The frame 200 also includes standard Fibre Channel cyclic redundancy code (FC-CRC) 216 and an end of frame (EOF) field 218 that indicates the end of a frame. In one aspect, only the payload 210 of the frame is encrypted. In another aspect, other portions of the frame may be encrypted as well.

Figure 2B:
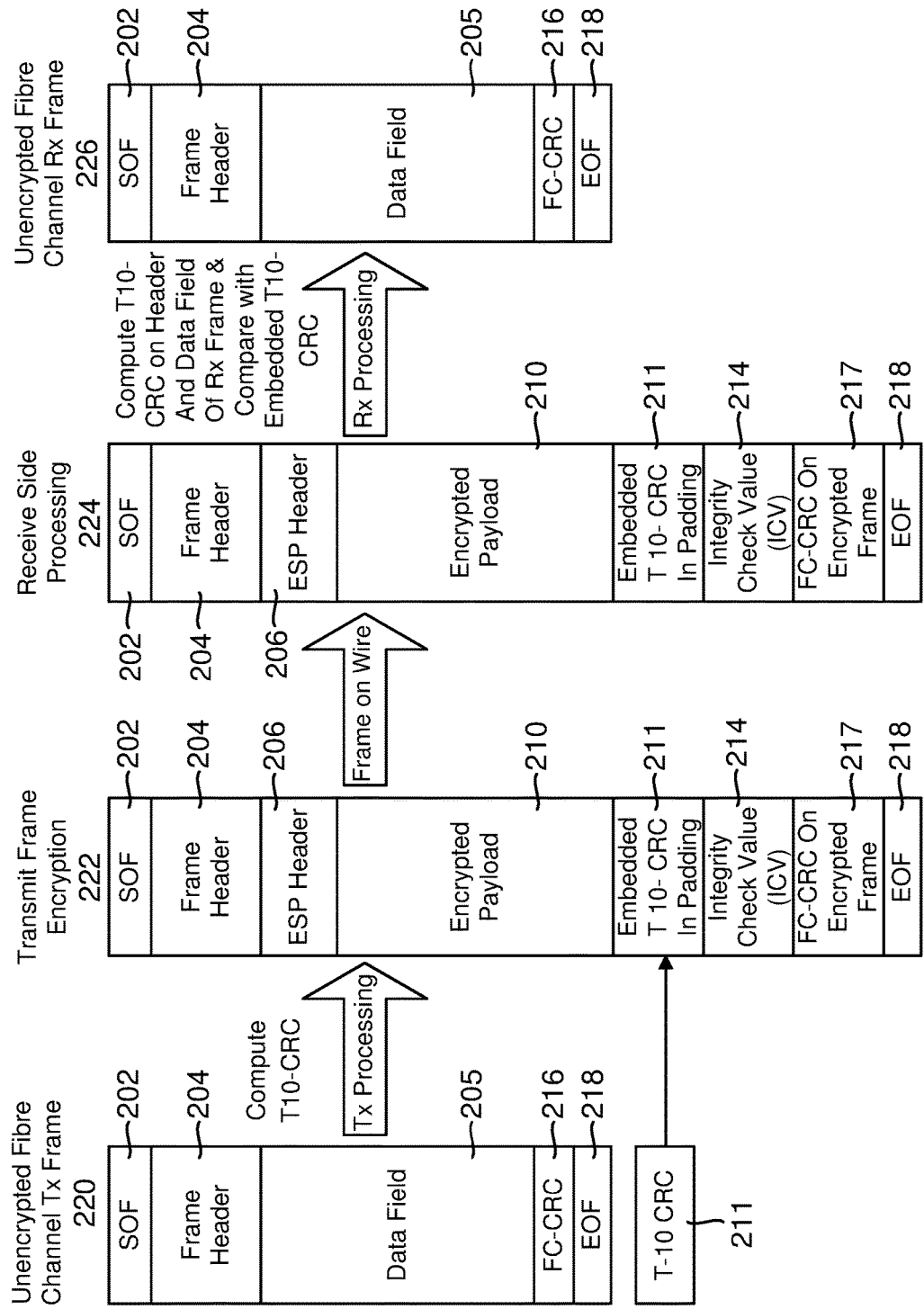
FIG. 2B shows an example of various stages of encryption/decryption of a frame, according to one aspect of the present disclosure.

FIG. 2B shows FC frame transformation for OPD, as described above with respect to FIGS. 1E and 1F. An unencrypted FC frame 220 with data field 205 is generated by the transmit side adapter 116A. The transmit side adapter computes the T-10 CRC 211 for OPD protection. The T-10 CRC 211 is embedded in the encrypted frame 222 that also includes ESP header 206, ICV 214, encrypted FC-CRC 217 and EOF 218. The encrypted frame 222 is received by a receiving adapter 116B that computes the T-10 CRC on header and data fields of the received frame (shown as part of receive side processing 224). The computed values are compared with the embedded value. If there is a match, the frame is decrypted that is shown as 226 and provided to the host via a DMA operation.

Figure 3:
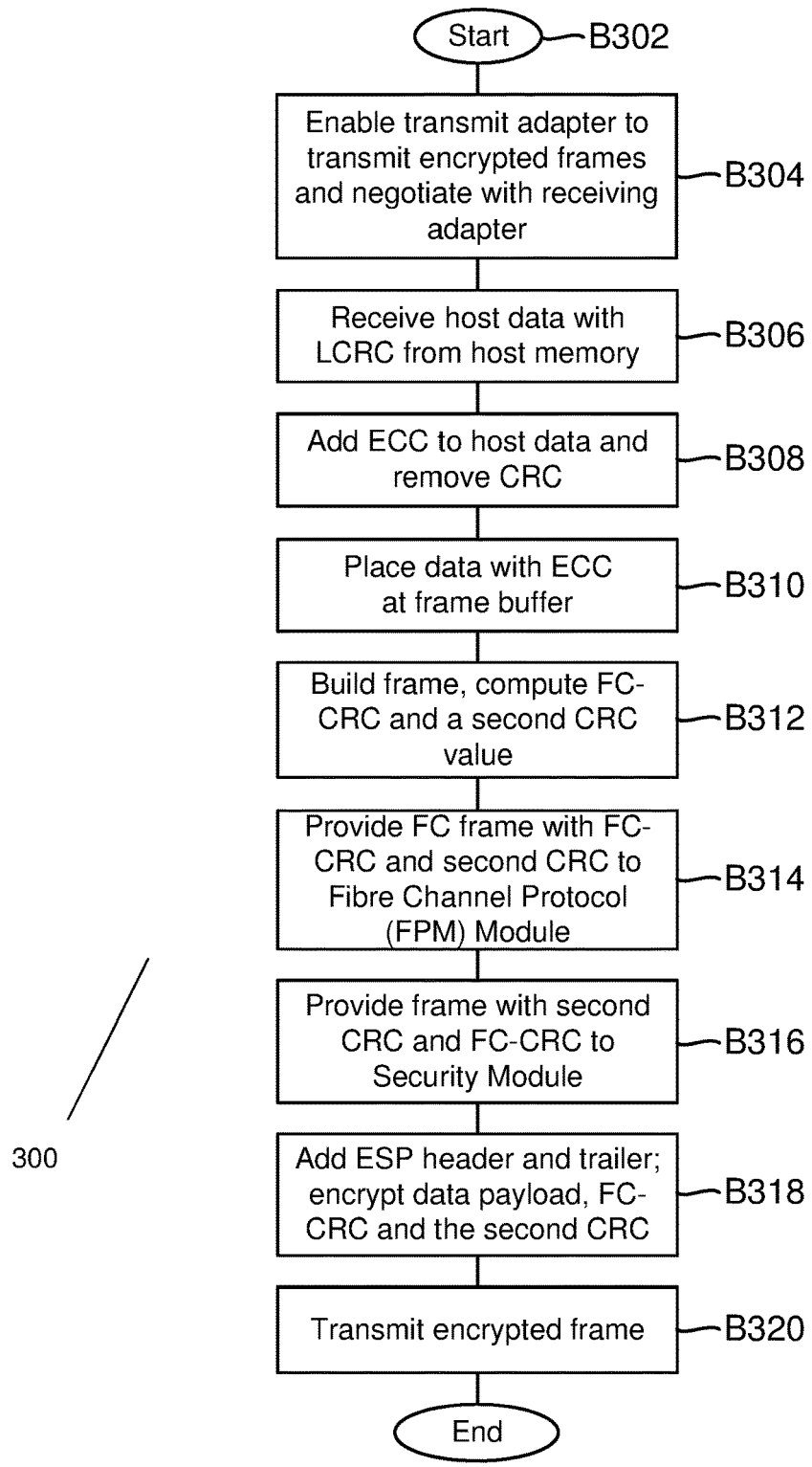
FIG. 3 shows a process for encrypting a frame for transmission, according to one aspect.

FIG. 3 shows a process 300 for generating and transmitting a frame with encryption and OPD, according to one aspect of the present disclosure. The process begins in block B302, when computing system 102 and adapter 116 are initialized. In block B304, the computing system 102 enables transmit side security option. This may be enabled by a configuration setting that is controlled by OS 140. For example, OS 140 may set a configuration bit that is read by firmware 146 to ascertain if secured transmission with encryption is enabled. The configuration bit may set at memory 126 or memory 106.

Once the transmit side adapter is configured for secure communication, the adapter (for example, 116A, FIG. 1B), starts a negotiation process to ensure that the receiving adapter (e.g. 116B, FIG. 1B) is ready to receive and process encrypted transmission. In one aspect, a special message may be sent to the receiving adapter to enable the receiving adapter for handling encrypted transmission. The message may indicate the type of encryption and parameters that are used by the transmitting adapter. The receiving adapter updates the SA data structure 143 to ensure that it has the encryption information for processing and decrypting a received packet.

In block B306, the transmitting adapter 116A retrieves data from host memory 106 for transmission. The data maybe placed by application 142 and then DMAed to the adapter. In one aspect, the received data (for example, 150, FIG. 1E) is protected by LCRC and received by PCIe module 152. In block B308, the PCIe module 152 first adds CRC 154 and then removes LCRC 156. The received data protected by ECC is then placed at transmit buffer 160 in block B310.

In block B312, framing logic 174 adds a FC header 173A and computes FC-CRC 173B. A second CRC, for example, T-10 CRC 173C is also computed. In one aspect, the second CRC does not include the S_ID, D_ID and CS-CTL/priority fields because these fields change as the frame moves through different network components. The FC frame 176 is then provided to the FPM module B314. In block B316, the FC frame with the second CRC is provided to the security module 141. In one aspect, instead of providing the FC Frame to the FPM module 164, the framing logic 174 may provide the FC frame with the second CRC directly to the security module 141.

In block B318, the encryption module 145 accesses the SA data structure 143 to retrieve encryption parameters that are to be used for FC frame 176. The encryption module 145 adds an ESP header 206 and ICV 214. The FC-CRC is encrypted as well and so is the T-10 CRC. The T-10 CRC is part of the frame padding. The encryption module 145 sets the padding length to indicate that it includes the T-10 CRC.

In block B320, the encrypted frame 182 with encryption payload 210 and the embedded T-10 CRC 211 is transmitted to the receiving adapter (116B, FIG. 1B). It is noteworthy that there may be other network components, for example, switches and adapters that move the encrypted frame to its destination, the receiving adapter 116B.

Figure 4:
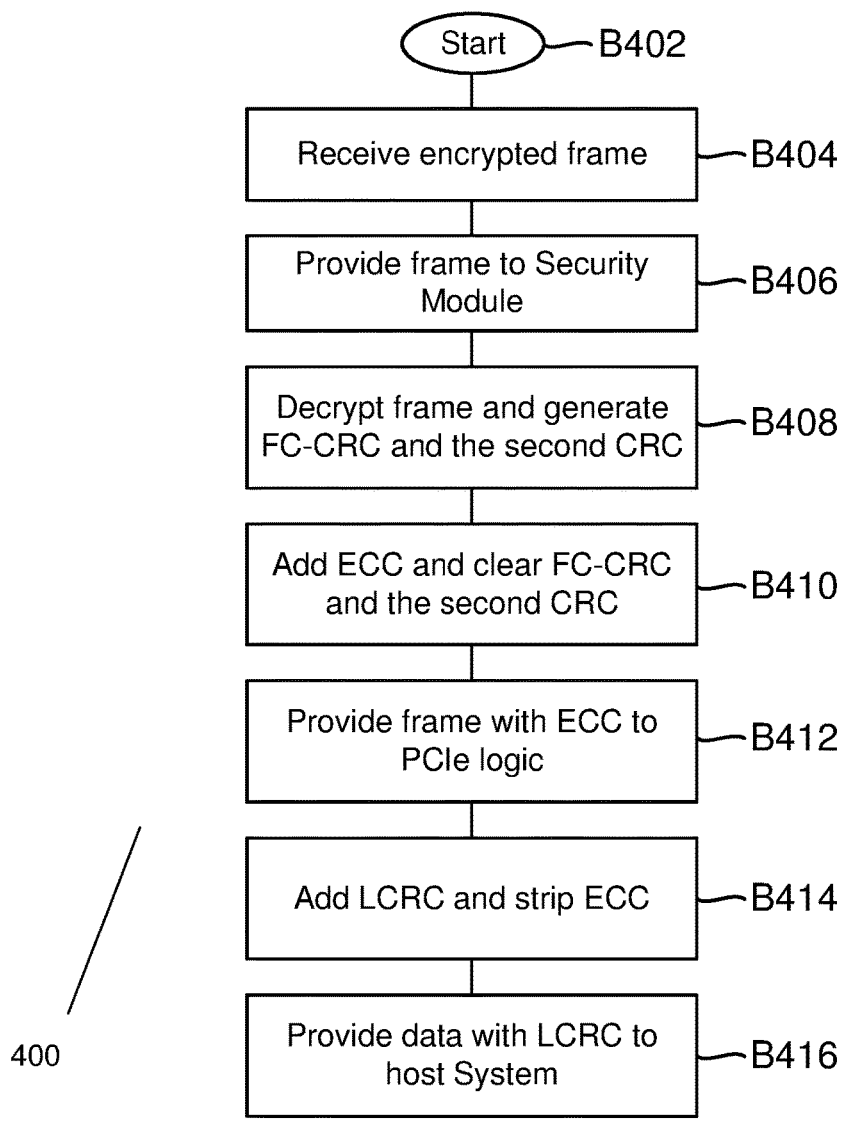
FIG. 4 shows a process flow for processing a received encrypted frame, according to one aspect of the present disclosure.

FIG. 4 shows a process 400 for processing a received encrypted frame, according to one aspect of the present disclosure. The process begins in block B402, after an encrypted frame has been transmitted, as described above with respect to FIG. 3. The encrypted frame (for example, 182, FIG. 1F) is received in block B404 by FC-PHY 168A. The frame is provided to the security module 141 in block B406.

In block B408, the decryption module 147 uses the ESP header to lookup a security parameter index (SPI) from the SA data structure 143. If there is match, then the decryption module 147 decrypts the frame. The ESP header and trailer are stripped. The decryption module 147 also generates the FC-CRC and the T-10 CRC. The T-10 CRC is generated without the S_D, D_ID and CS CTL/Priority fields. The generated FC-CRC and the T-10 CRC is compared to the FC-CRC and the T-10 CRC of the decrypted frame. If the ICV 214 and the T-10 CRC matches, then the frame is provided to the FPM 164A without any errors.

In block B410, the FPM 164A computes ECC for the frame and clears the FC-CRC and the T-10 CRC. The frame with ECC is then placed at the receive buffer 160A. In block B412, the frame and ECC is provided to the PCIe module 152A. In block B414, the PCIe module 152A adds the LCRC and strips the ECC. The payload with the LCRC is then provided to the host in block B416, via a DMA operation. Thereafter, the process ends.

In one aspect, the methods and systems described above enable OPD with encryption. This ensures that data security is enabled from one end to another.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:
receiving at an adapter, data with a first type of error protection code from a host memory of a computing device;
adding by the adapter a second type of error protection code to the data before removing the first type of error protection code;
generating by the adapter, a frame header for the data with a protocol specific protection code and a third type of error protection code, where the third type of error protection code is generated without using any frame header field that can change after the data is transmitted by the adapter via a network link;
encrypting by the adapter, the data, the protocol specific protection code and the third type of error protection code; and
transmitting by the adapter, the encrypted data with encrypted protocol specific protection code and encrypted third type of error protection code to a receiving adapter communicating with the adapter by the network link.

2. The method of claim 1, wherein the first type of error protection code is a local cyclic redundancy code (LCRC).

3. The method of claim 1, wherein the protocol specific protection code is a Fibre Channel cyclic redundancy code (FC-CRC).

4. The method of claim 1, wherein the third type of error protection code is a cyclic redundancy code (CRC).

5. The method of claim 1, wherein the frame header is a Fibre Channel header.

6. The method of claim 1, wherein an encapsulating security payload (ESP) header and trailer is added by the adapter to the encrypted data transmitted using the network link.

7. The method of claim 1, wherein the third type of error protection code is embedded as padding in the transmitted encrypted data.

8. A non-transitory, machine readable storage medium having stored thereon instructions for performing a method, comprising machine executable code which when executed by at least one machine, causes the machine to:

receive at an adapter, data with a first type of error protection code from a host memory of a computing device;

add by the adapter a second type of error protection code to the data before removing the first type of error protection code;

generate by the adapter, a frame header for the data with a protocol specific protection code and a third type of error protection code, where the third type of error protection code is generated without using any frame header field that can change after the data is transmitted by the adapter via a network link;

encrypt by the adapter, the data, the protocol specific protection code and the third type of error protection code; and transmit by the adapter, the encrypted data with encrypted protocol specific protection code and encrypted third type of error protection code to a receiving adapter communicating with the adapter by the network link.

9. The non-transitory storage medium of claim 8, wherein the first type of error protection code is a local cyclic redundancy code (LCRC).

10. The non-transitory storage medium of claim 8, wherein the protocol specific protection code is a Fibre Channel cyclic redundancy code (FC-CRC).

11. The non-transitory storage medium of claim 8, wherein the third type of error protection code is a cyclic redundancy code (CRC).

12. The non-transitory storage medium of claim 8, wherein the frame header is a Fibre Channel header.

13. The non-transitory storage medium of claim 8, wherein an encapsulating security payload (ESP) header and trailer is added by the adapter to the encrypted data transmitted using the network link.

14. The non-transitory storage medium of claim 8, wherein the third type of error protection code is embedded as padding in the transmitted encrypted data.

15. A system comprising:

a processor executing instructions out of a memory and interfacing with an adapter, wherein the adapter is configured to receive, data with a first type of error protection code from the memory; add a second type of error protection code to the data before removing the first type of error protection code; generate a frame header for the data with a protocol specific protection code and a third type of error protection code, where the third type of error protection code is generated without using any frame header field that can change after the data is transmitted by the adapter via a network link; encrypt the data, the protocol specific protection code and the third type of error protection code; and transmit the encrypted data with encrypted protocol specific protection code and encrypted third type of error protection code to a receiving adapter communicating with the adapter by the network link.

16. The system of claim 15, wherein the first type of error protection code is a local cyclic redundancy code (LCRC).

17. The system of claim 15, wherein the protocol specific protection code is a Fibre Channel cyclic redundancy code (FC-CRC).

18. The system of claim 15, wherein the third type of error protection code is a cyclic redundancy code (CRC).

19. The system of claim 15, wherein the frame header is a Fibre Channel header.

20. The system of claim 15, wherein an encapsulating security payload (ESP) header and trailer is added by the adapter to the encrypted data transmitted using the network link and the third type of error protection code is embedded as padding in the transmitted encrypted data.

* * * * *